US011975342B2

(12) United States Patent
Van Rijn et al.

(10) Patent No.: US 11,975,342 B2
(45) Date of Patent: May 7, 2024

(54) SPRAY DEVICE AND SPRAY NOZZLE UNIT

(71) Applicant: Medspray B.V., Enschede (NL)

(72) Inventors: Cornelis Johannes Maria Van Rijn, Amsterdam (NL); Wietze Nijdam, Enschede (NL); Wilhelmus Petrus Johannes De Kruijf, Enschede (NL); Henri Joseph Van Egmond, Enschede (NL)

(73) Assignee: Medspray B.V., Enschede (NL)

( * ) Notice: Subject to any disclaimer, the term of this patent is extended or adjusted under 35 U.S.C. 154(b) by 193 days.

(21) Appl. No.: 17/288,237

(22) PCT Filed: Oct. 24, 2019

(86) PCT No.: PCT/NL2019/050702
§ 371 (c)(1),
(2) Date: Apr. 23, 2021

(87) PCT Pub. No.: WO2020/085908
PCT Pub. Date: Apr. 30, 2020

(65) Prior Publication Data
US 2021/0387209 A1 Dec. 16, 2021

(30) Foreign Application Priority Data
Oct. 24, 2018 (NL) ..................................... 2021872

(51) Int. Cl.
*B05B 1/32* (2006.01)
*B05B 15/40* (2018.01)

(52) U.S. Cl.
CPC .............. *B05B 1/323* (2013.01); *B05B 15/40* (2018.02)

(58) Field of Classification Search
CPC ................................ B05B 1/323; B05B 15/40
USPC ..................... 239/533.15, 570, 571, DIG. 22
See application file for complete search history.

(56) References Cited

U.S. PATENT DOCUMENTS

| | | | |
|---|---|---|---|
| 2004/0020173 A1 | 2/2004 | Cho | |
| 2017/0281880 A1 | 10/2017 | Van Egmond et al. | |

FOREIGN PATENT DOCUMENTS

| | | |
|---|---|---|
| DE | 3645354 C2 | 5/2003 |
| EP | 1747816 A2 | 1/2007 |
| WO | 2017/095220 A1 | 6/2017 |

OTHER PUBLICATIONS

International Search Report and Written Opinion, PCT Application No. PCT/NL2019/050702 , dated Mar. 18, 2020 (10 pages).

*Primary Examiner* — Christopher S Kim
(74) *Attorney, Agent, or Firm* — Occhiuti & Rohlicek LLP

(57) ABSTRACT

A spray device has a spray nozzle unit (1), wherein said spray nozzle unit (1) comprises a cavity (5) with an inlet (2) for receiving a pressurized liquid at an operating pressure and an outlet (3) for releasing a liquid spray during operation. A spray nozzle body (10) is fitted sealingly within said cavity (5), having a perforated nozzle layer (14) with at least one spray orifice (16) that extends between an upstream surface and a down stream surface thereof releasing at least one jet of said liquid spray at said downstream surface of said nozzle layer. The spray nozzle unit (1) is provided with a pressure safety device (30) upstream of said spray nozzle body (10). Said pressure safety device (30) comprises a closed burst layer (34) that closes a fluid pathway between said inlet (2) and said spray nozzle body (10) but ruptures once a threshold pressure is exceeded. Said operating pressure exceeds said threshold pressure.

18 Claims, 3 Drawing Sheets

SPRAY DEVICE AND SPRAY NOZZLE UNIT

CROSS-REFERENCE TO RELATED APPLICATIONS

This application is a 371 application of International Application no. PCT/NL2019/050702, filed Oct. 24, 2019, which claims the benefit of the filing date of Netherlands Application No. 2021872, filed Oct. 24, 2018, the contents of which are hereby incorporated by reference in their entirety.

The present invention relates to a spray device, having a spray nozzle unit, wherein said spray nozzle unit comprises nozzle holder with a cavity having an inlet for receiving a pressurized liquid at an operating pressure and an outlet for releasing a liquid spray during operation, wherein a spray nozzle body is fitted sealingly within said cavity of said nozzle holder, said spray nozzle body having a perforated nozzle layer with at least one spray orifice that extends between an upstream surface and a down stream surface thereof, said downstream surface receiving said pressurized liquid during operation and said at least one spray orifice releasing at least one jet of said liquid spray at said downstream surface of said nozzle layer.

A spray device of the above kind uses the spray nozzle unit to create a spray, also referred to as mist or aerosol, of extremely fine droplets out of a pressurized liquid. Said liquid may be contained in a container like a bottle, cannister or syringe that is moreover provided with pressurizing means to force said liquid under an appropriate pressure to the inlet of the spray nozzle unit. Often said spray nozzle unit will be fitted with its inlet directly on an outlet of said container and/or of such pressurizing means like a pump or a pressurized propellant. This allows the pressurized liquid to enter the cavity, where it is forced to the nozzle device and through the nozzle layer for generating the spray.

The spray device according to the invention is particularly suitable for generating a so-called micro-jet spray of very fine droplets, having a controlled pre-defined size. Such micro-jet spray may contain many emitting jets, in which each jet will initially breakup into a mono disperse primary droplet train according to the so-called Rayleigh breakup mechanism. As a result, consecutive primary droplets have a same size and propagate from the nozzle orifice in a same direction, typically the diameter of the primary droplet is 1.85-2.0 times the diameter of the nozzle orifice. Often the corresponding nozzle orifices are provided in a planar substrate yielding jets that are all directed in a same or varying spraying direction, depending on the specific nozzle configuration. Due to possible coalescence of mutually interfering droplets the average droplet size within the spray may eventual grow, but an actual droplet size distribution of the spray nonetheless still remains confined between relatively narrow boundaries.

The spray nozzle orifices that extend through the spray nozzle layer unavoidably create an open fluid path between the liquid content of the device and the environment. On the one hand this may result in inadvertent evaporation of the liquid concerned, escaping in the downstream direction. On the hand this also allows ambient air to pass upstream while the device is not being used. This air will then enter the cavity and may finally reach the container where it will come into contact with the liquid content of the spray device. This might lead to microbial ingrowth and premature deterioration of the liquid. In practice this may reduce the shelf life of the product and may compromise its microbial integrity.

Particularly for preservative-free pharmaceutical spray liquids that are kept in a sterilized condition it is important to protect the content of the spray device against these factors. To this end, it has been proposed to seal off the spray nozzle unit with a airtight plastic foil that covers the outlet of the spray device. From a user point of view, however, this is experienced as inconvenient and complicated as the sealing foil needs to be peeled off manually before the device may be used. Especially for inhaler spray devices, which preferably are immediately ready-for-use when needed, this is a encountered as a significant drawback. And also from a manufacturing perspective said solution is not favoured as it adds an additional production step with inherent complexity to the manufacturing process of device.

It is therefore, among others, an aim of the present invention to provide a spray nozzle device having a more convenient means of protecting the initial content of the device.

In order to achieve said goal, a spray device of the type described in the opening paragraph, according to the invention, is characterized in that a pressure safety device is provided upstream of said spray nozzle body, in that said pressure safety device comprises a closed burst layer that closes a fluid pathway to said spray nozzle body but ruptures once a threshold pressure is exceeded, and in that said operating pressure exceeds said threshold pressure. The pressure safety device that is placed upstream of the nozzle body seals any communication path between the environment and the liquid content of the spray device by means of said closed burst layer as long as the device is not used for the first time. However, once the pressurized liquid is released to the spray nozzle unit for the first time, the burst layer will be exposed to the operating pressure of the device, causing the burst layer to rupture or burst as this pressure exceeds the threshold pressure. This will automatically open a pathway to the spray nozzle body that will immediately start to release the intended liquid spray. This all happens without any further necessary intervention by the patient or user, rendering the device according to the invention extremely convenient and fool-proof for use.

In a particular embodiment the pressure safety device is integrated in the nozzle holder of the spray nozzle unit itself. To that end, a particular embodiment of the spray nozzle device according to the invention is characterized in that said pressure safety device comprises a pressure safety body that is fitted sealingly within said cavity of said nozzle holder between said inlet of said nozzle holder and said spray nozzle body.

To facilitate an easy in-line testing of the spray nozzle unit as well as a convenient post-assembly of the pressure safety device, a preferred embodiment of the spray device according to the invention is characterized in that said pressure safety device is mounted directly downstream of said inlet, particularly at or near said inlet. In this respect "directly downstream" is meant to indicate that the pressure safety device is the most upstream member within said cavity of said holder and, hence, may be placed as final product finishing the spray nozzle unit.

To further aid a fluid-tight placement of the pressure safety device, a further preferred embodiment of the spray device according to the invention is characterized in that said pressure safety body is fitted sealingly in an adapter ring, said adapter ring surrounding the pressure safety body and being sealed to an inner wall of said cavity, particularly by fusion or gluing. The adapter ring in that case fills any intervening space between the pressure safety body and the inner wall of said cavity. Moreover, the adapter ring may be sealed inside the cavity using proven sealing techniques, like fusing and gluing. To that end a further preferred embodiment of the spray device according to the invention is characterized in that both said nozzle holder and said adapter ring comprise a suitable plastic, particularly a thermoplastic polymer, more particularly a same plastic.

In a particular embodiment, wherein said spray nozzle body comprises a first plate body having at least one first cavity extending throughout a thickness thereof, wherein said nozzle layer extends over said at least one first cavity, the spray nozzle device according to the invention is further characterized in that said pressure safety body comprises a second plate body having at least one second cavity extending throughout a thickness thereof, wherein said burst layer extends over said second cavity, and in that said first plate body and said second plate body are fitted sealingly within said cavity of said nozzle holder. The steps necessary for mounting the pressure safety device within the spray nozzle unit are in that case equal or at least similar to the steps used for fitting the nozzle body. This will, hence, add no substantial complexity to the assembly of the spray nozzle unit.

A further preferred embodiment of the spray device according to the invention is characterized in that said first plate body and said second plate body each comprise a silicon body, and in that said nozzle layer and said burst layer each comprise at least one of a silicon nitride and a silicon oxide layer covering the respective silicon body. In this case not only the assembly of the spray nozzle unit but also the manufacturing of the pressure safety device fits seamlessly into that of the spray nozzle body itself. The materials used for the respective parts of the device are well known in the field of semiconductor manufacturing. As a result, both plate bodies may conveniently be created as (micro)chips using state of the art semiconductor or micro machining manufacturing technology, resulting in a high precision and reliability combined with a very well controlled reproducibility.

An important factor for the device to function properly is that the burst layer should indeed break below the normal operating pressure of the device. To that end a preferred embodiment of the spray device according to the invention is characterized in that said burst layer is provided with at least one burst zone of reduced stress resistance. The formation of such one or more burst zones creates an intended weakness in the burst layer that promotes a controlled rupture below said operating pressure.

In a first particular embodiment, the spray device according to the invention is characterized in that said second cavity has a polygonal lateral cross section that is spanned by said burst layer. The polygonal shape of the second cavity gives rise to a stress concentration in and around the corners of the cavity. This will induce a weakness in the burst layer that promotes rupture once it is exposed to the pressurized liquid at the operating pressure of the spray device.

In a further particular embodiment the spray device according to the invention is thereby characterized in that said at least one burst zone comprises at least one burst line along which said burst layer has a reduced thickness. Especially if these burst lines or zones are formed using high precision semiconductor or micro machining technology, a very well controlled and predictable behaviour of the pressure safety device may be obtained.

In order top avoid that part of the broken or ruptured burst layer may adversely affect the functioning of the spray nozzle body, a further preferred embodiment of the spray device according to the invention is characterized in that a sieve device is fitted within said cavity between said pressure safety device and said spray nozzle device, said sieve device having a plurality of sieve passages and being capable of intercepting debris of said burst layer. This way the sieve device will prevent any debris of the burst layer, that might otherwise cause clogging or otherwise obstructing a nozzle orifice, from reaching the nozzle body.

In a further preferred embodiment the device according to the invention is thereby characterized in that said spray nozzle body comprises a first plate body having at least one first cavity extending throughout a thickness thereof, wherein said nozzle layer extends over said at least one first cavity, in that said sieve device comprises a further plate body having at least one cavity extending throughout a thickness thereof and a sieve layer extending over said cavity, said sieve layer having a plurality of sieve passages extending throughout a thickness thereof, similar or smaller in size but of greater number than said at least one spray orifice, and in that said first plate body and said further plate body are fitted sealingly within said cavity of said nozzle holder. The steps necessary for mounting the sieve device within the spray nozzle unit are in that case equal or at least similar to the steps used for fitting the nozzle body itself. This will, hence, add no substantial complexity to the assembly of the spray nozzle unit.

A further preferred embodiment of the spray device according to the invention is characterized in that said first plate body and said further plate body each comprise a silicon body, and in that said nozzle layer and said sieve layer each comprise at least one of a silicon nitride and a silicon oxide layer covering the respective silicon body. In this case not only the assembly, but also the manufacturing of the sieve device fits seamlessly into that of the spray nozzle unit. The materials used for the respective parts of the device are well known in the field of semiconductor or micro machining manufacturing. As a result, both plate bodies may conveniently be created as (micro)chips using state of the art semiconductor or micro machining manufacturing technology, resulting in a high precision and reliability combined with a very well controlled reproducibility.

The invention also relates to a spray nozzle unit of the kind as applied in the spray device according to the invention and will now be described in further detail with reference to one or more embodiments and an accompanying drawing. In the drawing.

Figure 1A:
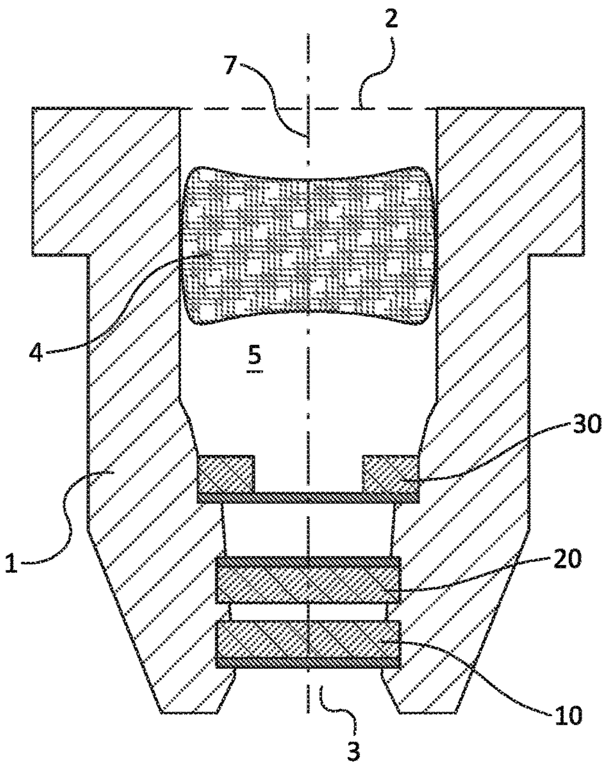
FIG. 1A is a cross section of a first typical example of a spray nozzle unit for use in or on a spray device according to the invention.

It should be noticed that the drawings are drafted purely schematically and not to scale. In particular, certain dimensions may have been exaggerated to a lesser or greater extent for sake of clarity and understanding. Corresponding parts have been identified with same reference numerals throughout the drawing.

FIG. 1A shows an example of a spray nozzle unit as used in a spray device according to the invention. The nozzle unit comprises a solid or assembled nozzle holder 1 of plastic with an internal cavity 5. In the example shown both the cavity 5 and the body itself have a circular cross-section around a centre line 7, but in practice may each have any convenient design and dimension. The nozzle unit body 1 may conveniently be formed form a thermoplastic polymer, like polyethylene or poly-propylene, such that it may be manufactured using a conventional thermo-form process, like for instance blow moulding.

In the present example, the spray nozzle unit presents a so-called Luer fitting that may be fitted directly on a syringe or the like that contains or supplies a fluid to be sprayed from a container and that is assumed to be known to skilled person. This fluid is received under an operating pressure of several Bar to over 10 Bar at an inlet 2 of the cavity 5, forced by suitably selected pressurizing means, to be delivered to a spray nozzle body 10 that is mounted at an outlet side 3 of the spray nozzle unit.

Figure 3:
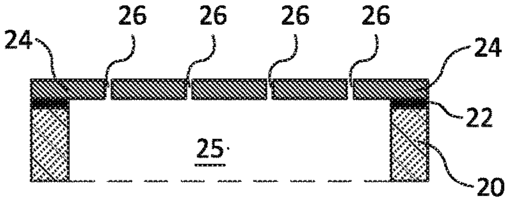
FIG. 3 is a cross section of a sieve device as applied in the spray nozzle unit of FIGS. 1A and 1B.

The spray nozzle body 10 is depicted in greater detail in FIG. 3 and comprises a silicon plate body 10 (chip) of several hundreds micron thickness that is covered by a silicon oxide layer 12 and a silicon nitride layer 14. The silicon nitride layer 14 has a thickness of one or more micron and spans one or more cavities 15 formed inside the silicon body 10 to create a perforated nozzle layer (membrane) that is provided with at least one spray orifice 16 at the location of each such cavity 15. The cavities 15 have typically a circular cross section of the order of 50 to 100 micron diameter.

The spray orifices 16 extend throughout the thickness of said nitride layer 14 from an upstream surface to a downstream surface thereof and each have a precisely defined and etched size of a few micron to 10 or more micron. During operation, pressurized fluid that is received by the cavity 5 of said nozzle unit will enter the cavities 15 of said nozzle chip 10 and will pass through these nozzle orifices 16. At the downstream outlet side 3 the liquid will then emanate in the form of a fluid ray that breaks up (so called Rayleigh breakup) into a droplet train of fluid droplets of a well controlled droplet size. This will create a spray (mist) of droplets within an very well defined droplet size distribution.

Preceding the spray nozzle, i.e. upstream, is a sieve device 20 having a plurality of sieve passages 26 of equal or smaller size than the spray nozzle orifices 16, as shown in greater detail in FIG. 3. These sieve passages protect the nozzle body against clogging as particles or other bodies that might otherwise block a nozzle orifice are effectively blocked and intercepted by the sieve device. Like the nozzle device 10, the sieve device 20 comprises a silicon body (chip) of the order on a few hundred micron thickness in which a cavity 25 is created running throughout its thickness. On top of this silicon body 20 are a silicon oxide layer 22 and a silicon nitride layer 24. The latter extends over said cavity 25 to form a sieve plate having a great number of sieve passages 26 that are precisely etched throughout its thickness. This thickness may exceed that of the nozzle layer 14 to gain additional strength. The number of passages 26 greatly outnumbers the number of nozzle orifices 16 in order to guarantee an uninterrupted delivery of fluid to the nozzle body 10.

Both the nozzle body 10 and the sieve device 20 allow a free flow of both fluid from within the device to the environment as well as of ambient air to within the cavity 5 of the nozzle unit. The latter may be contaminated with micro-organisms, like bacteria, fungi and viruses. In order to prevent evaporation of liquid from the pre filled syringe via the open nozzle chip and to prevent microbial ingrowth into the container, a pressure safety device 30 is placed upstream of the sieve device 20 within the cavity 5. This pressure safety device is shown in greater detail in FIGS. 4A and 4B. The pressure safety device contains a closed burst layer 34 extending over an opening 35 that is in direct communication with the inlet 2 of the nozzle unit. The closed burst layer 34 initial seals the flow path to the syringe completely, to prevent premature evaporation of liquid and to protect the content of the syringe or other container to which the nozzle unit is mounted against microbial intrusion, see FIG. 4A.

Figure 4A:
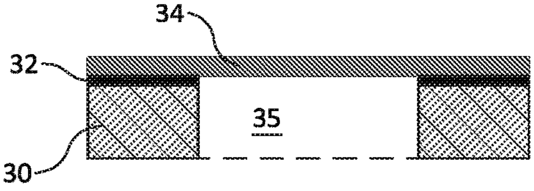
FIGS. 4A, 4B are cross sections of a pressure safety device as applied in the spray nozzle unit of FIGS. 1A and 1B in a closed and open condition, respectively.
Figure 4B:
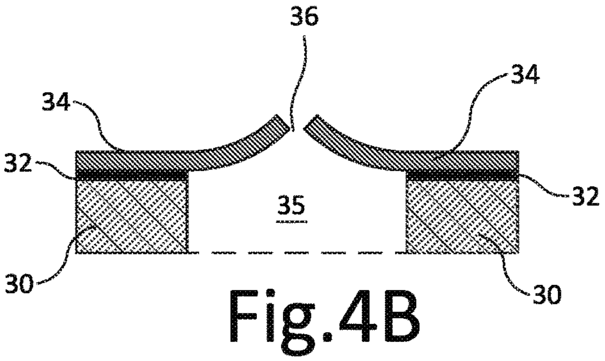

Once a threshold pressure of the burst layer is exceeded, however, it will burst or rupture thus opening said flow path, see FIG. 4B. The burst layer 34 is configured to have a threshold pressure below a normal operating pressure of the spray device in which the nozzle unit is applied, for instance between 2 and 3 Bar, such that this opening of the flow path will occur automatically once the pressure means of the device are actuated by a user and a pressurized liquid is forced under said operating pressure against said burst layer. This will open the flow path to the nozzle device 10 causing the spray device to generate an undisturbed spray. This way the spray nozzle unit has an internal lidding foil, or a 'lidding chip', which is opened at first use. This is a one-time event. At the first use of the spray nozzle unit, it is 'deflowered' but during shelf life there is no open path between the container content and the outside world.

In this example also the pressure safety device has been formed using a similar semiconductor or micro machining manufacturing technology that has also been used for the formation of the nozzle chip 10 and sieve chip 20. As such the safety device 30 comprises a silicon semiconductor body with a central cavity 35 that is spanned by a silicon nitride burst layer 34 of appropriate thickness to allow rupture of this layer below a the operating pressure of the spray device. The nitride layer 34 is given a thickness of 1 micron or less to assure breakage below the operating pressure. In between the nitride layer 34 and the silicon body is a thin silicon oxide layer 32. In this example the thickness of the burst layer is chosen below the respective thicknesses of the sieve layer 24 and nozzle layer 14 that are both dimensioned to withstand said operating pressure.

Because of the constructional similarity between the pressure safety device 30 and the nozzle device 10, not only a similar manufacturing technique but also similar pick-and-place methods and equipment may be used during assembly of the nozzle device for properly positioning and fastening the pressure safety device within the cavity 5 of the nozzle unit. Any potential debris from the rupture of the burst layer 34 will be intercepted by the sieve device 20 and, hence, will not influence the spray behaviour, nor will it be inhaled, ingested or otherwise be administered to the user of the spray device. This order of placement also enables an in line testing with air or another gas of the nozzle device 10 and sieve device 20 after assembly. The safety device 30 may in that case be mounted in place afterwards, followed by a porous pre-filter 4 of an appropriate woven or non-woven polymer fabric, like fluffy polypropylene.

Figure 1B:
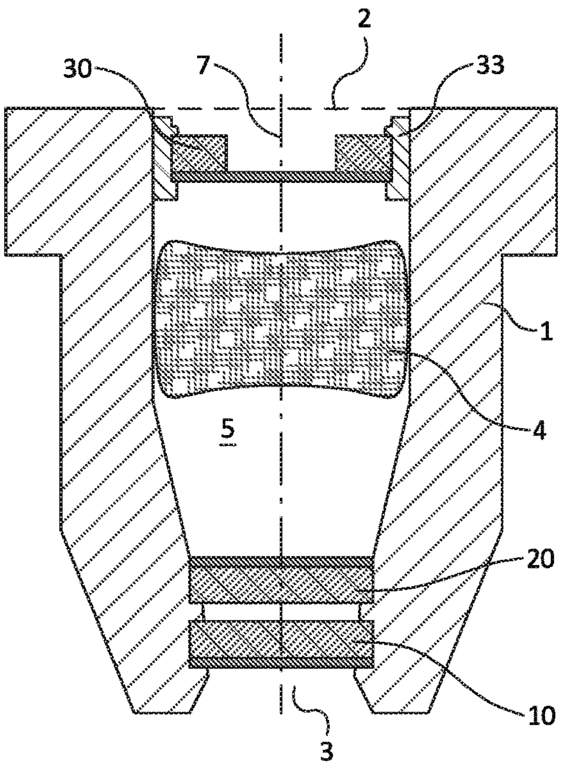
FIG. 1B is a cross section of a second typical example of a spray nozzle unit for use in or on a spray device according to the invention.
Figure 2:
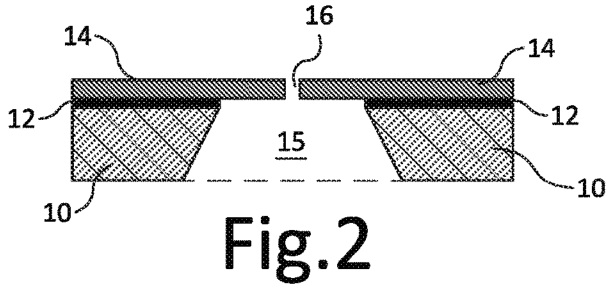
FIG. 2 is a cross section of a nozzle device as applied in the spray nozzle unit of FIGS. 1A and 1B.

An alternative embodiment of a spray nozzle unit with such an integrated pressure safety device is shown in FIG. 1B. Also in this case the pressure safety device contains a silicon semiconductor body with a nitride burst layer, similar to that as in the device of FIG. 1A. In this example, however, the silicon body is not mounted directly in the cavity 5 of the nozzle holder 1, but fitted in a surrounding adapter ring 33. This adapter ring may be formed of a thermoplastic polymer, particularly the same or a similar plastic as the nozzle unit itself, and crosses the space between the smaller silicon body and the internal wall of the cavity 5. This saves chip area, hence, cost, but moreover allows proven fusion techniques, like melting and gluing, for mounting and sealing the safety device 30 within the cavity after the nozzle unit has been tested with the nozzle body 10 and sieve body 20 in place. In this case the pressure safety device is, moreover, placed upstream of the porous pre-filter 4, but might also be positioned downstream of the pre-filter 4.

Figure 5:
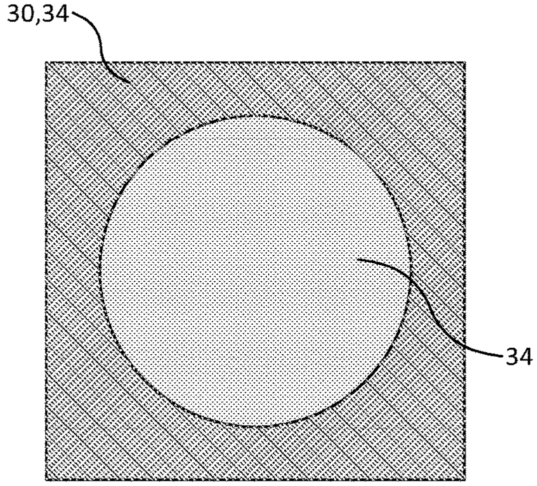
FIG. 5 is a top, planar view of the pressure safety device of FIG. 4A.
Figure 6A:
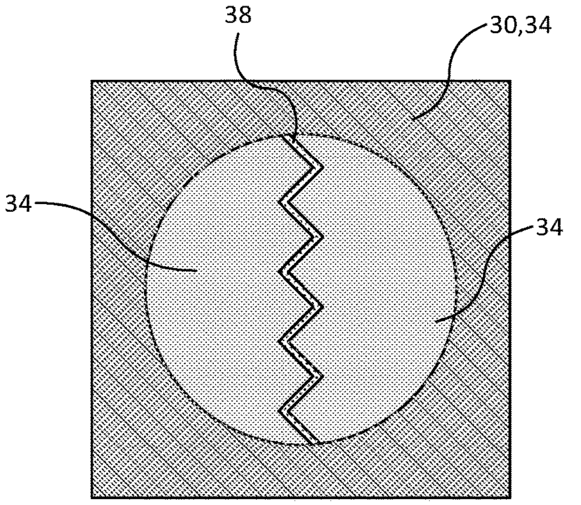
FIG. 6A is a top, planar view of a first alternative embodiment of a pressure safety device for use a spray nozzle unit of a spray device according to the invention.
Figure 6B:
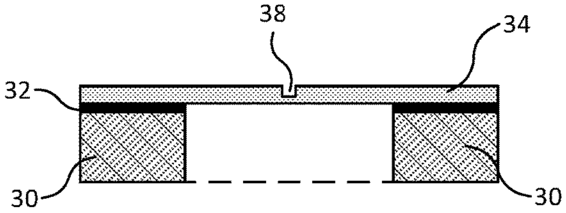
FIG. 6B is a cross section of the pressure safety device of FIG. 6A.
Figure 7:
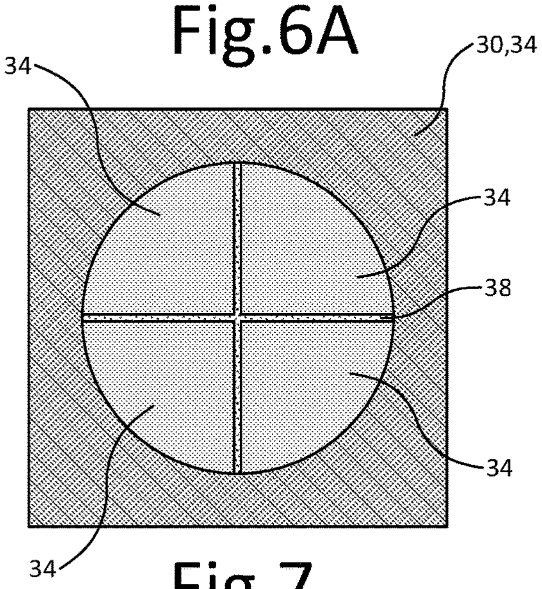
FIG. 7 is a top, planar view of a second alternative embodiment of a pressure safety device for use a spray nozzle unit of a spray device according to the invention.
Figure 8:
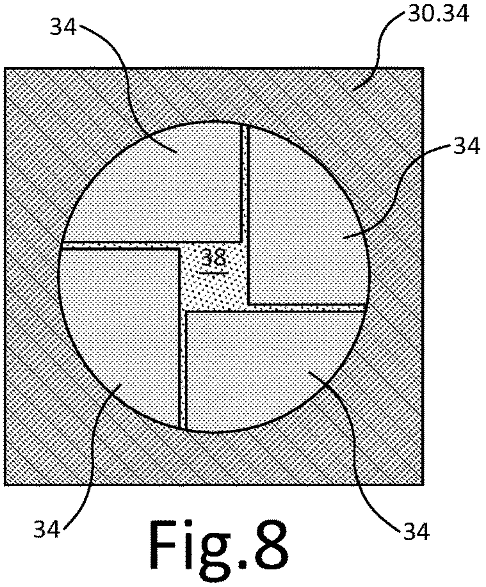
FIG. 8 is a top, planar view of a third alternative embodiment of a pressure safety device for use a spray nozzle unit of a spray device according to the invention.
Figure 9:
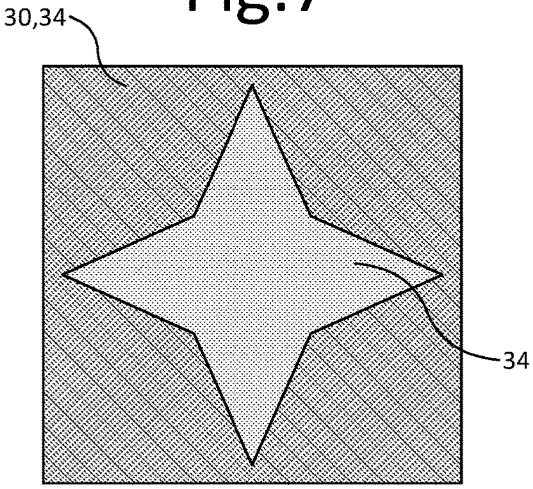
FIG. 9 is a top, planar view of a fourth alternative embodiment of a pressure safety device for use a spray nozzle unit of a spray device according to the invention.

The pressure safety device of FIG. 4A is shown in top view in FIG. 5A with the burst layer 34 extending over the central cavity 35. In order to promote rupture of the burst layer one or more weakening zones or lines 38 of reduced stress resistance may be formed in the burst layer 34 as shown in FIGS. 6A, 7 and 8 in top view and in FIG. 6B in cross section. As shown in FIG. 6B these lines or zones are created by a local thickness reduction 38 along these lines or zones. This will result in a local weakening of the burst layer and a more controlled rupture along these lines or zones. Alternatively or additionally also the central cavity 35 may be given a polygonal lateral cross section as shown along the embodiment of FIG. 9 that will lead to a stress concentration in the vicinity of the corners.

Figure 10A:
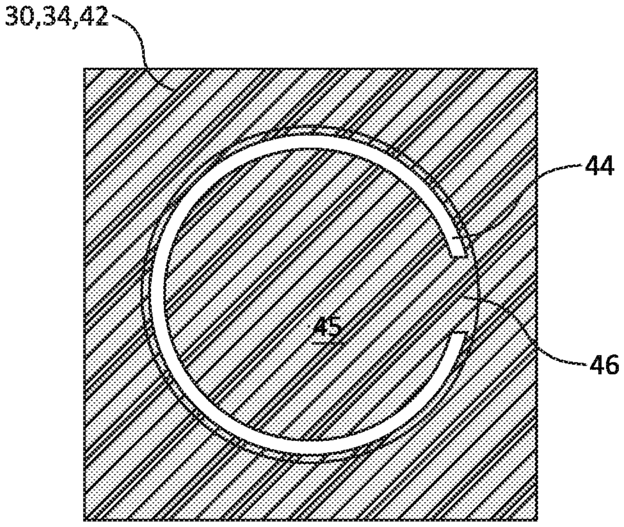
FIG. 10A is a top, planar view of a fifth alternative embodiment of a pressure safety device for use a spray nozzle unit of a spray device according to the invention.
Figure 10B:
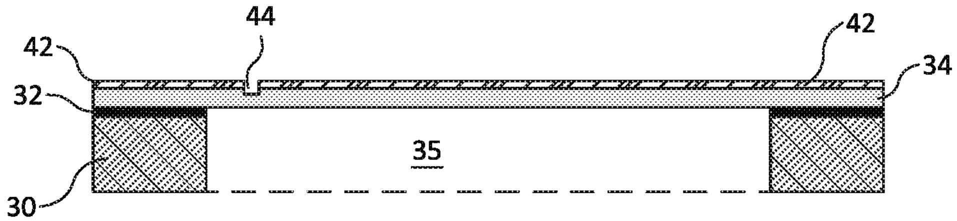
FIGS. 10B, 10C are cross sections of the pressure safety device of figure in a closed and open condition, respectively.
Figure 10C:
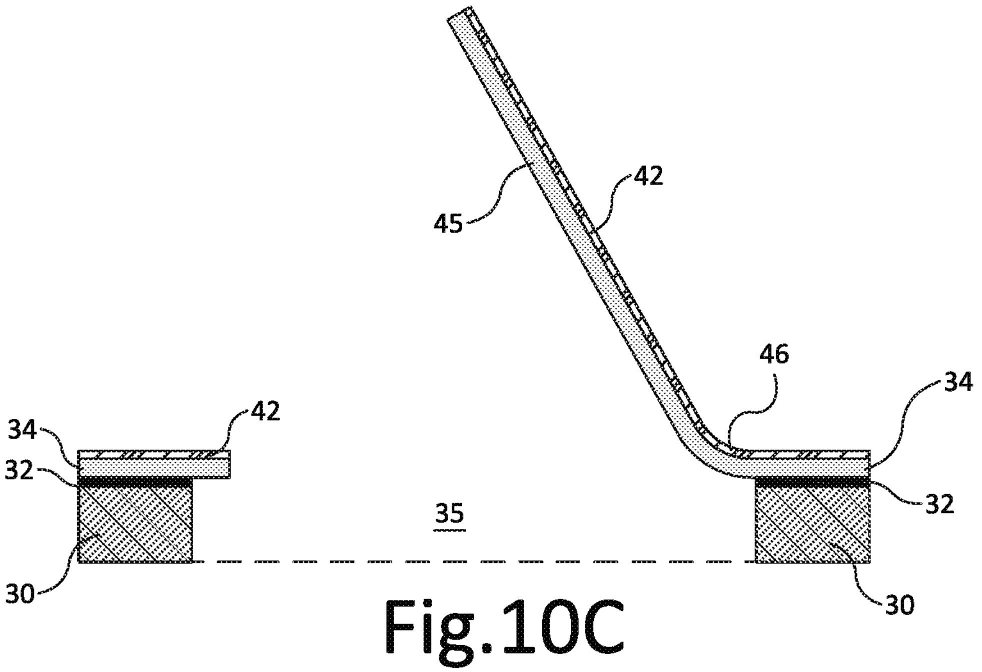

FIG. 10A-10C show in planar top view and cross section, respectively, a fifth embodiment of a pressure safety device for use in a spray device according to the invention. The configuration of this embodiment is similar to that of FIGS. 6A and 6B in that it comprises a semiconductor silicon body 30 on top of which an silicon oxide layer 32 is grown and a silicon nitride burst layer 34 is deposited with a thickness of the order on a few micron. In this embodiment, however, the structure is coated or otherwise covered by a flexible thermoplastic polymer layer 42 that sticks to the nitride layer 34. In this case parylene is used for the polymer layer 42 with a thickness of only a few micron or even less than a micron.

A breaker line or zone 44 has been formed in the nitride burst layer 34 in the form of a depression or ditch 44 that extends almost along the entire periphery of the cavity 35 except for a relatively small hinge portion 46. Said ditch extends entirely across the plastic layer 42 to create a peninsula like central portion 45 of the plastic layer and said nitride layer 34. The ditch 44 delivers a weakness in the nitride burst layer 34 causing the nitride layer 34 to burst at a pressure of the order of a few bar, which is below the normal operating pressure of the spray device.

The plastic layer 42 on top, however, has sufficient flexibility and tensile strength to withstand this pressure and will hinge along the hinge portion as shown in FIG. 10C, while keeping the central portion 45 of the nitride layer 34 to it. This will avoid the loss of any noticeable debris of the nitride burst layer 34 once it bursts, while creating a considerable opening 35 in the support body 30. Due to this enhanced retention of material of the burst layer 34 this embodiment might also be applied down stream of the nozzle body without the risk that debris of the burst layer will interfere with, or enter into the spray that is to be generated by the spray device.

In all cases the closed burst layer effectively closes the pathway between any liquid to be sprayed and the environment before initial use of the device. The strength of the burst layer is, however, chosen such that it will burst once it is exposed to the normal operating pressure of the spray device to which the spray nozzle unit is mounted. This will automatically open said pathway without any necessary additional interference by the user and renders the device ready for use.

Although the invention has been describes hereinbefore with reference to merely a few specific embodiments, it will be clear that the invention is by no means limited to these examples. Instead many alternatives and variations are feasible for a skilled person without departing from the scope and spirit of the present invention. As such the pressure safety device need not be placed in the nozzle holder or spray nozzle unit but may also reside upstream thereof, for instance between a container, containing the fluid to be sprayed, or pumping means of the spray device and the spray nozzle unit or holder.

Other designs, materials and dimensions may be used for the safety device 30 and, particularly, the burst layer 34. This also concerns mutatis mutandis the sieve device and the nozzle device as well as the nozzle unit. Particularly the beaker layer might as well comprise a polymer foil or metal foil that is attached to a support body, extending over a central opening. Also other thermoplastic materials can be used than parylene, to cover the burst layer and to form one or more flexible hinges. The plastic materials can be anchored in the micro machined silicon structure by forming anchoring holes or the like. Preferably use is made of a bio-compatible plastic in case of medical appliances.

Also more that one cavity may be formed in the support body of the safety device, spanned by the same or individual burst layers, to implement several parallel pathways through the device, again to assure breakage of at least one of them below the operating pressure.

In the example a so called Luer type nozzle unit has been shown for placement on a syringe. Alternative the nozzle unit may be give any appropriate design to match a particular spray device, which might, for instance, be a spray cannister, bottle, ampul or any other container holding a certain amount of fluid to be pressurized by means of appropriate pressurizing means of the spray device.

The invention claimed is:

1. Spray device having a spray nozzle unit, wherein said spray nozzle unit comprises a nozzle holder with a cavity having an inlet for receiving a pressurized liquid at an operating pressure and an outlet for releasing a liquid spray during operation, wherein a spray nozzle body is fitted sealingly within said cavity of said nozzle holder, said spray nozzle body having a perforated nozzle layer with at least one spray orifice that extends between an upstream surface and a downstream surface thereof, said downstream surface receiving said pressurized liquid during operation and said at least one spray orifice releasing at least one jet of said liquid spray at said downstream surface of said nozzle layer, wherein a pressure safety device is provided upstream of said spray nozzle body, in that said pressure safety device comprises a closed burst layer that closes a fluid pathway to said spray nozzle body but ruptures once a threshold pressure is exceeded and wherein said operating pressure exceeds said threshold pressure.

2. Spray device according to claim 1, wherein said pressure safety device is fitted sealingly within said cavity of said nozzle holder, residing between said inlet of said nozzle holder and said spray nozzle body.

3. Spray device according to claim 2, wherein said pressure safety body is fitted sealingly in an adapter ring, said adapter ring surrounding the pressure safety body and being sealed to an inner wall of said cavity.

4. Spray device according to claim 3, wherein both said nozzle holder and said adapter ring comprise a plastic.

5. Spray device according to claim 4, wherein both said nozzle holder and said adapter ring comprise a thermoplastic polymer.

6. Spray device according to claim 5, wherein both said nozzle holder and said adapter ring comprise a same thermoplastic polymer.

7. Spray device according to claim 3, wherein said adapter ring is sealed to the inner wall of said cavity by fusion or gluing.

8. Spray device according to claim 2, wherein said pressure safety device is mounted directly downstream of said inlet.

9. Spray device according to claim 2, wherein said spray nozzle body comprises a first plate body having at least one first cavity extending throughout a thickness thereof, wherein said nozzle layer extends over said at least one first cavity, in that said pressure safety body comprises a second plate body having at least one second cavity extending throughout a thickness thereof, wherein said burst layer extends over said second cavity, and wherein said first plate body and said second plate body are fitted sealingly within said cavity of said nozzle holder.

10. Spray device according to claim 9, wherein said first plate body and said second plate body each comprise a silicon body, and wherein said nozzle layer and said burst layer each comprise at least one of a silicon nitride and a silicon oxide layer covering the respective silicon body.

11. Spray device as claimed in claim 9, wherein said second cavity has a polygonal lateral cross section that is spanned by said burst layer.

12. Spray device according to claim 1, wherein said burst layer is provided with at least one local weakening of the burst layer, thereby defining a burst zone that creates an intended weakness in the burst layer to promote controlled rupture below said operating pressure.

13. Spray device according to claim 12, wherein said at least one local weakening of the burst layer comprises at least one burst line.

14. Spray device according to claim 1, wherein a sieve device is fitted within said cavity of said nozzle holder between said pressure safety device and said spray nozzle device, said sieve device having a plurality of sieve passages and being capable of intercepting debris of said burst layer.

15. Spray device according to claim 14, wherein said spray nozzle body comprises a first plate body having at least one first cavity extending throughout a thickness thereof, wherein said nozzle layer extends over said at least one first cavity, in that said sieve device comprises a further plate body having at least one cavity extending throughout a thickness thereof and a sieve layer extending over said cavity, said sieve layer having said plurality of sieve passages extending throughout a thickness thereof, identical or smaller in size but of greater number than said at least one spray orifice, and wherein said first plate body and said further plate body are fitted sealingly within said cavity of said nozzle holder.

16. Spray device according to claim 15, wherein said first plate body and said further plate body each comprise a silicon body, and wherein said nozzle layer and said sieve layer each comprise at least one of a silicon nitride and a silicon oxide layer covering the respective silicon body.

17. Spray device according to claim 1, wherein a flexible retention layer is formed over the burst layer, and wherein a depression is formed along a peninsula portion of the retention layer and burst layer at the area of the cavity, said depression extending through said retention layer and part of a thickness of said burst layer.

18. Spray nozzle unit as applied in the spray device according to claim 1.

* * * * *